US012507000B2

(12) United States Patent
Shao

(10) Patent No.: US 12,507,000 B2
(45) Date of Patent: Dec. 23, 2025

(54) COAXIAL SPEAKER

(71) Applicant: AAC Microtech (Changzhou) Co., Ltd., Jiangsu (CN)

(72) Inventor: Tao Shao, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 261 days.

(21) Appl. No.: 18/525,895

(22) Filed: Dec. 1, 2023

(65) Prior Publication Data

US 2024/0340572 A1 Oct. 10, 2024

Related U.S. Application Data

(63) Continuation of application No. PCT/CN2023/087191, filed on Apr. 10, 2023.

(51) Int. Cl.

*H04R 1/24* (2006.01)
*H04R 1/02* (2006.01)
*H04R 7/12* (2006.01)
*H04R 9/04* (2006.01)

(52) U.S. Cl.

CPC ............... *H04R 1/24* (2013.01); *H04R 1/023* (2013.01); *H04R 7/127* (2013.01); *H04R 9/045* (2013.01); *H04R 2400/11* (2013.01)

(58) Field of Classification Search

CPC .......... H04R 1/24; H04R 1/023; H04R 7/127; H04R 9/045

See application file for complete search history.

(56) References Cited

U.S. PATENT DOCUMENTS 10,631,096 B1 * 4/2020 Garcia Selva ....... H04R 1/2873
2009/0136065 A1 * 5/2009 Yano ........................ H04R 9/10 381/186
2012/0148086 A1 * 6/2012 Tanabe ..................... H04R 1/24 381/401

* cited by examiner

*Primary Examiner* — Suhan Ni
(74) *Attorney, Agent, or Firm* — Wiersch Law Group

(57) ABSTRACT

The present disclosure discloses a coaxial speaker including a frame, a magnet system, a first vibration system, and a second vibration system surrounded by and coaxially arranged with the first vibration system. The first vibration system includes a first diaphragm and a first coil. The second vibration system includes a second diaphragm and a second coil. The magnet system includes a first yoke, a first magnet and a second yoke, a second magnet and a third yoke are successively stacked on the first magnet. The second yoke includes a protrusion towards the second diaphragm, a first magnetic gap is formed between the first magnet and the first yoke, a second magnetic gap is formed between the second magnet and the protrusion, the first coil and the second coil are separately inserted into the first magnetic gap and the second magnetic gap.

10 Claims, 4 Drawing Sheets

C

COAXIAL SPEAKER

FIELD OF THE PRESENT DISCLOSURE

The present disclosure relates to electric-acoustic conversion technologies, especially relates to a coaxial speaker applied in portable mobile terminals.

DESCRIPTION OF RELATED ART

A coaxial speaker in portable mobile terminals is one of the necessary conditions to achieve this high-quality sound effect, which is configured to achieve conversion between electric signal and acoustic signal.

In related art, the coaxial speaker includes two different speakers stacked together to provide sound signal in different frequency range, such as medium frequency band and high frequency band. However, the stacked structure has a large size which is unfavorable for miniaturization. Besides, the sound channels of the two stacked speakers have different orientations, resulting in loudness deficiency and unsatisfactory sound quality. Moreover, the two speakers have individual magnet systems, thus increasing material cost. Utilization of each magnet system cannot be maximized.

Therefore, it is necessary to provide an improved coaxial speaker to overcome the problems mentioned above.

SUMMARY OF THE INVENTION

One object of the present disclosure is to provide a coaxial speaker with higher magnet utilization and smaller size.

The coaxial speaker includes a frame; a magnet system mounted on the frame, including a first yoke fixed to the frame, a first magnet received in the first yoke, a second yoke, a second magnet and a third yoke sequentially stacked on one side of the first magnet away from the first yoke; a first vibration system, including a first diaphragm mounted on the frame; and a first coil configured to drive the first diaphragm; a second vibration system surrounded by and coaxially arranged with the first vibration system, including: a second diaphragm mounted on the third yoke; and a second coil configured to drive the second diaphragm; wherein the second yoke includes a protrusion towards the second diaphragm; a first magnetic gap is formed between the first magnet and the first yoke; the second magnet surrounds the protrusion at interval forming a second magnetic gap; the first coil is inserted into the first magnetic gap; the second coil is inserted into the second magnetic gap; the first magnet and the second magnet has opposite magnetization directions parallel to a vibration direction.

As an improvement, the first yoke includes a bottom wall configured to support the first magnet, a side wall bent and extended from the bottom wall towards the first diaphragm, and a fixation wall bent and extended from the side wall away from the second yoke; the fixation wall is fixed to the frame; the second yoke is disposed opposite to the fixation wall along the vibration direction.

As an improvement, the second yoke includes a first magnetic portion sandwiched between the first magnet and the second magnet, a second magnetic portion bent from an edge of the first magnetic portion and extended to an inner side of the second magnet, and a third magnetic portion connected to the second magnetic portion; the protrusion is formed by the second magnetic portion and the third magnetic portion; the second magnet is spaced apart from the second magnetic portion to form the second magnetic gap; the third magnetic portion is disposed opposite to the third yoke along the vibration direction.

As an improvement, further including a holder fixed to the third yoke; the second diaphragm includes a second dome in a central position and a second edge portion surrounding the second dome; an outer edge of the second edge portion is fixed to the holder; the second dome is arranged opposite to the protrusion along the vibration direction; the second dome protrudes along a direction away from the protrusion.

As an improvement, further including a mesh cover disposed above the second diaphragm at interval; a plurality of sound holes is provided on the mesh cover; an outer edge of the mesh cover is fixed to the holder.

As an improvement, the first diaphragm includes a first inner portion fixedly connected to the mesh cover, a first outer portion fixedly connected to the frame, and a first dome connecting the first inner portion and the first outer portion; along the vibration direction, the first inner portion is disposed on a side of the first outer portion closer to the magnet system.

As an improvement, the mesh cover includes a sound portion having the sound holes, a fixation portion surrounding the sound portion and fixed to the holder, and a support portion extended from the fixation portion towards the frame; an inner edge of the first inner portion is fixed to the support portion; an outer edge of the first inner portion is fixed to the first dome.

As an improvement, further including a supporter including one end fixed to the first dome and the other end fixed to the frame.

As an improvement, the magnet system further includes a vent hole penetrated the bottom wall and the first magnet along the vibration direction; the vent hole is disposed opposite to the third magnetic portion.

As an improvement, the first vibration system further includes a first skeleton fixedly connected to the first dome; the first coil is inserted into the first magnetic gap through the first skeleton; the second vibration system further includes a second skeleton fixedly connected to the second dome; the second coil is inserted into the second magnetic gap through the second skeleton.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
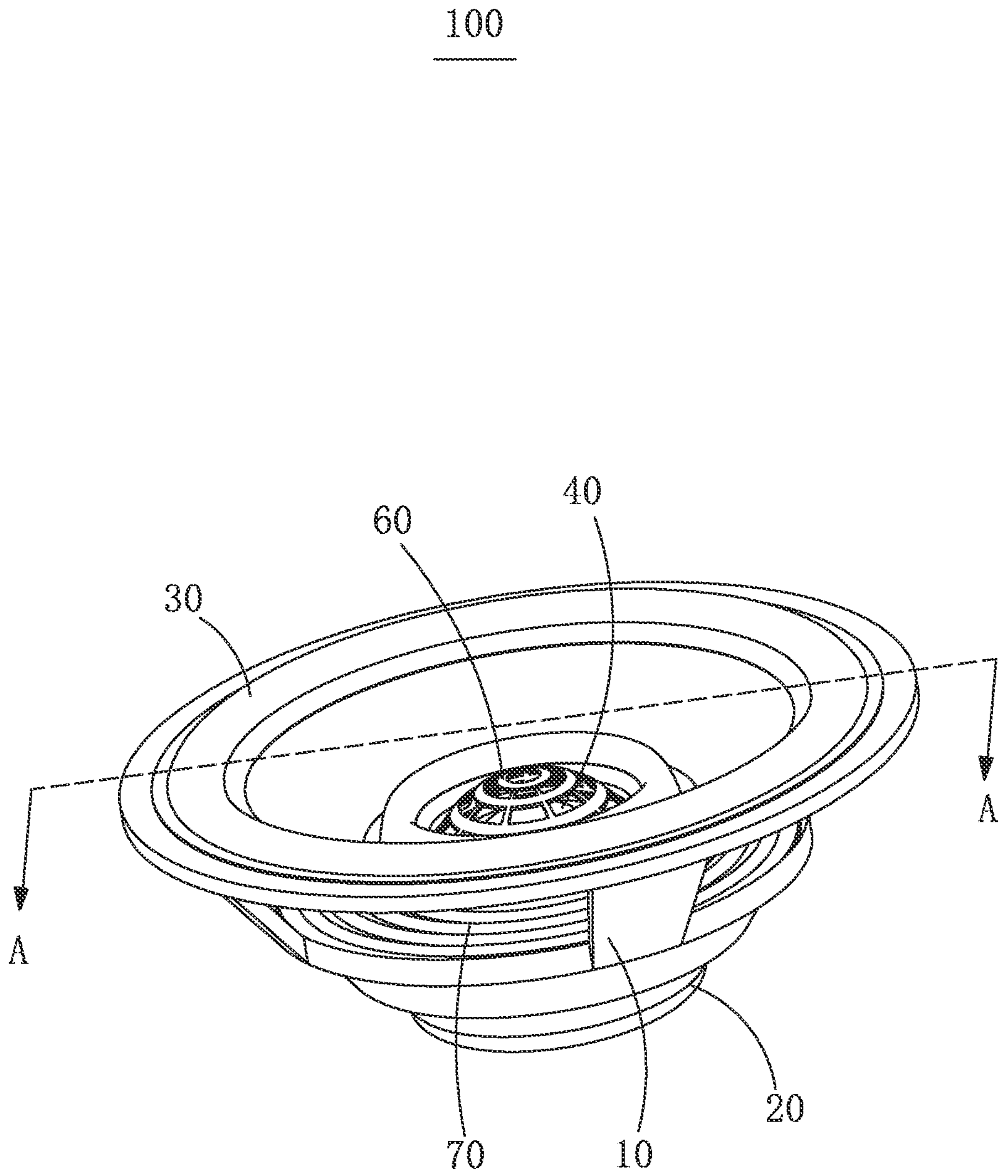
FIG. 1 is an isometric view of a coaxial speaker in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-5 together, a coaxial speaker 100 provided by an exemplary embodiment of the present disclosure includes a frame 10, a magnet system 20 mounted on the frame 10, a first vibration system 30 mounted on the frame 10, and a second vibration system 40 coaxially arranged with the first vibration system 30. Besides, the first vibration system 30 surrounds the second vibration system 40. It shows that two vibration systems are located on the same side of the magnet system 20, thereby reducing the size of the coaxial speaker 100 and improving the adaptability of the coaxial speaker 100 in different mobile terminals.

Specifically, the magnet system 20 includes a first yoke 21 fixed to the frame 10, a first magnet 22 received in the first yoke 21, a second yoke 23, a second magnet 24 and a third yoke 25 sequentially stacked on one side of the first magnet 22 away from the first yoke 21. The second yoke 23 includes a protrusion 231 towards the second vibration system 40. A first magnetic gap 26 is formed between the first magnet 22 and the first yoke 21, and the second magnet 24 surrounds the protrusion 231 at interval forming a second magnetic gap 27. The first magnet 22 and the second magnet 24 has opposite magnetization directions parallel to a vibration direction.

Figure 2:
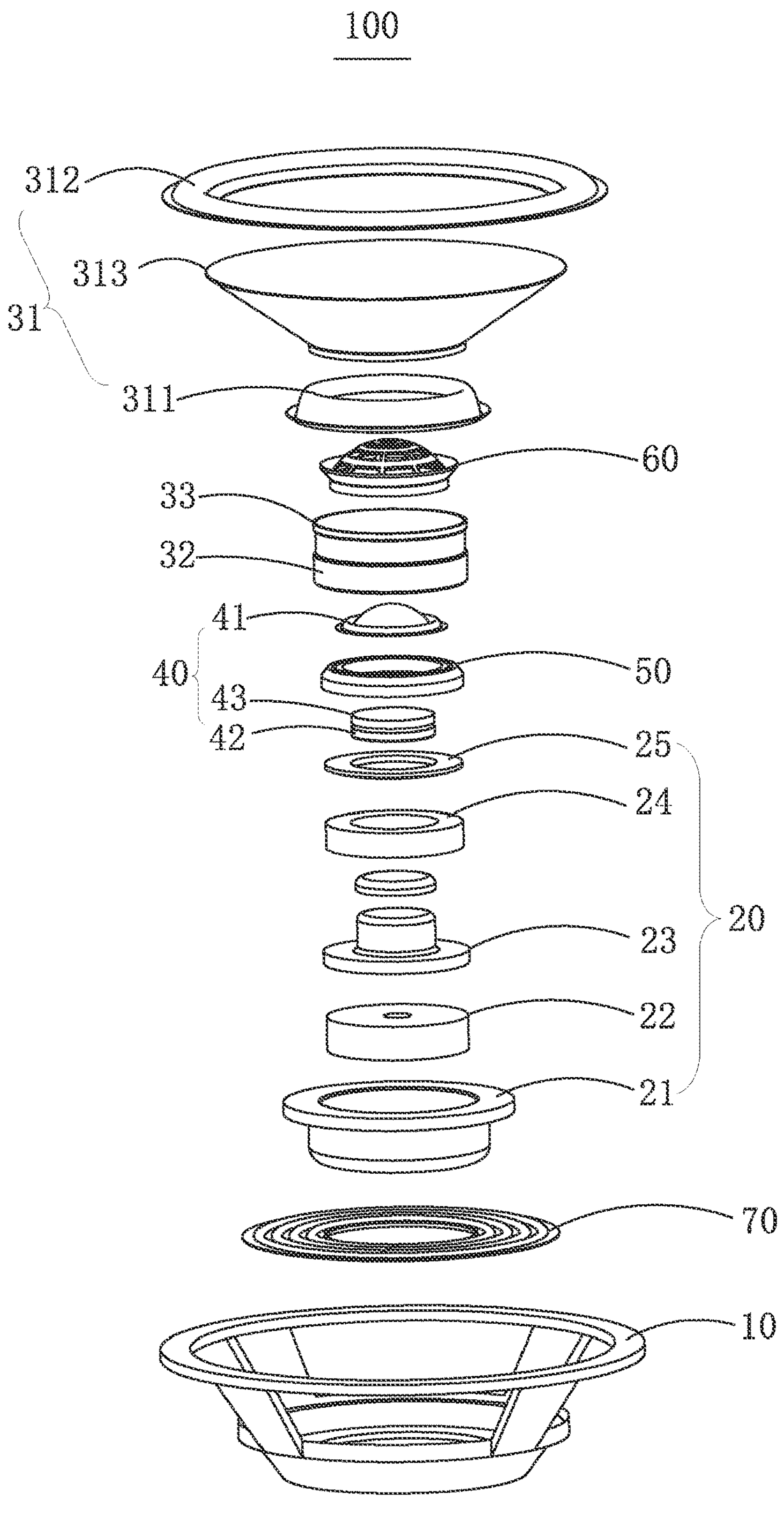
FIG. 2 is an exploded view of the coaxial speaker in FIG. 1.
Figure 3:
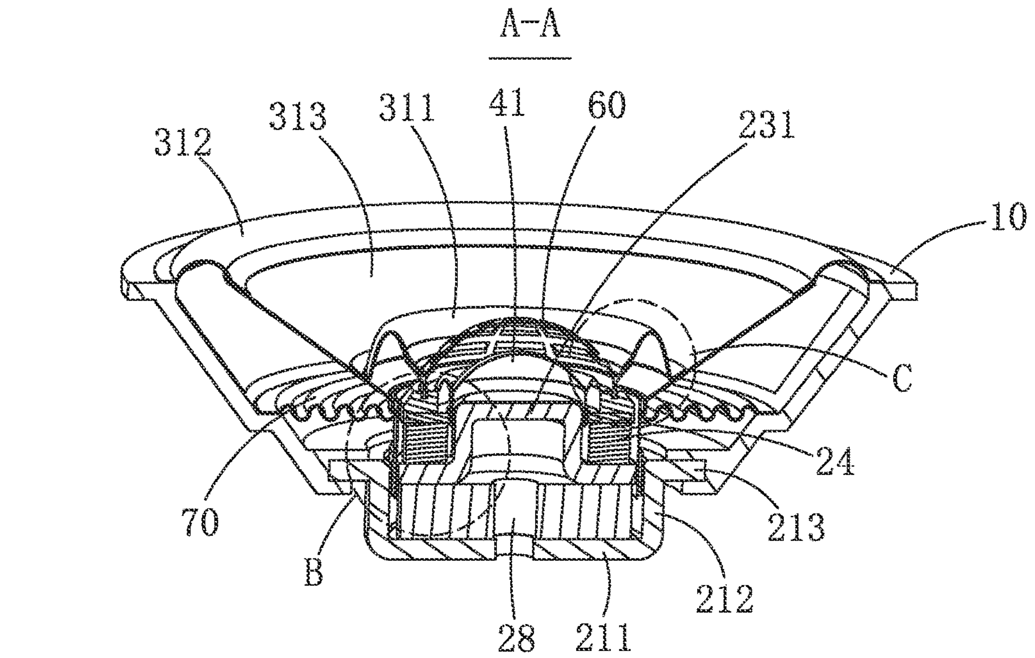
FIG. 3 is a cross-sectional view of the coaxial speaker taken along line A-A in FIG. 1.
Figure 4:
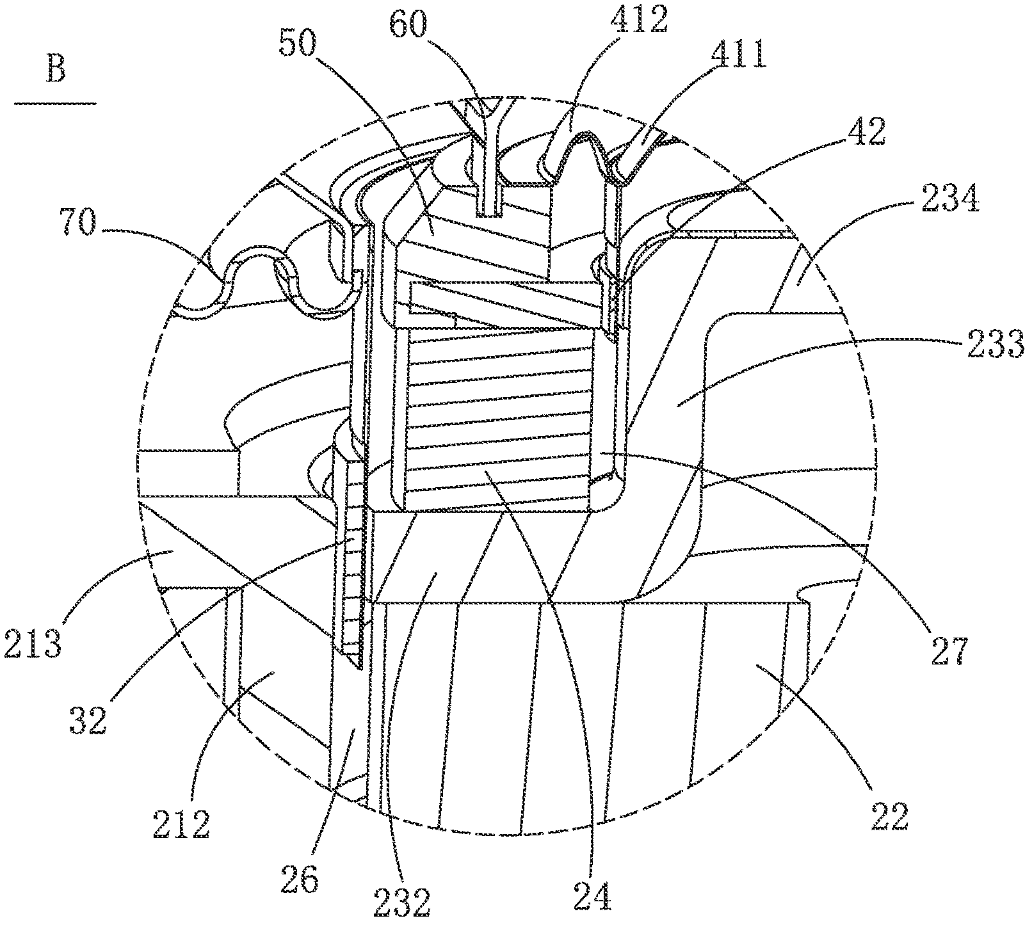
FIG. 4 is an enlarged view of Part B in FIG. 3.

As shown in FIGS. 2-4, the first vibration system 30 includes a first diaphragm 31 mounted on the frame 10 and a first coil 32 configured to drive the first diaphragm 31 to generate sound. The second vibration system 40 includes a second diaphragm 41 mounted on the magnet system 20 and a second coil 42 configured to drive the second diaphragm 41 to generate sound. The second diaphragm 41 is fixed to the third yoke 25.

More specifically, the first vibration system 30 further includes a first skeleton 33 fixedly connected to the first diaphragm 31, so the first coil 32 is inserted into the first magnetic gap 26 through the first skeleton 33. The second vibration system 40 further includes a second skeleton 43 fixedly connected to the second diaphragm 41, so the second coil 42 is inserted into the second magnetic gap 27 through the second skeleton 43.

Moreover, the coaxial speaker 100 includes a holder 50 fixed to the third yoke 25. The second diaphragm 41 includes a second dome 411 in a central position and a second edge portion 412 surrounding the second dome 411; an outer edge of the second edge portion 412 is fixed to the holder 50; the second dome 411 is arranged opposite to the protrusion 231 along the vibration direction; the second dome 411 protrudes along a direction away from the protrusion 231.

Furthermore, the coaxial speaker 100 includes a mesh cover 60 disposed above the second diaphragm 41 at interval; a plurality of sound holes 61 is provided on the mesh cover 60; the sound wave generated by the second diaphragm 41 is transmitted to outside through the sound hole 61; an outer edge of the mesh cover 60 is fixed to the holder 50.

Figure 5:
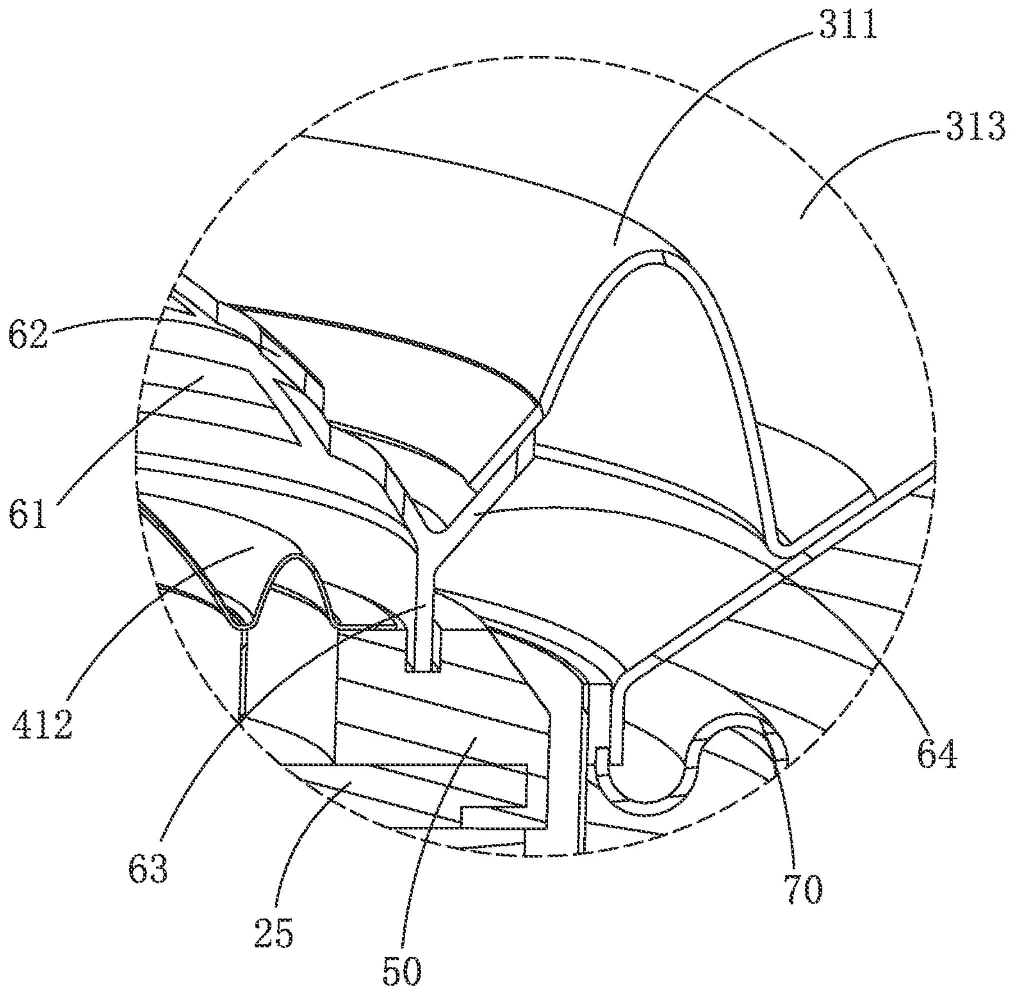
FIG. 5 is an enlarged view of Part C in FIG. 3.

As shown in FIGS. 3-5, the first diaphragm 31 includes a first inner portion 311 fixedly connected to the mesh cover 60, a first outer portion 312 fixedly connected to the frame 10, and a first dome 313 connecting the first inner portion 311 and the first outer portion 312; along the vibration direction, the first inner portion 311 is disposed on a side of the first outer portion 312 closer to the magnet system 20. In another word, along the vibration direction, a distance between the first outer portion 312 and the magnet system 20 is larger than a distance between the first inner portion 311 and the magnet system 20. Furthermore, the first skeleton 33 is fixedly connected to the first dome 313.

Concretely, the mesh cover 60 includes a sound portion 62 having the sound holes 61, a fixation portion 63 surrounding the sound portion 62 and fixed to the holder 50, and a support portion 64 extended from the fixation portion 63 towards the frame 10; an inner edge of the first inner portion 311 is fixed to the support portion 64; an outer edge of the first inner portion 311 is fixed to the first dome 313.

In particular, the coaxial speaker 100 includes a supporter 70. One end of the supporter 70 is fixed to the first dome 313 and the other end of the supporter 70 is fixed to the frame 10. The first vibration system 30 is stably supported by the supporter 70.

Compared with the related art, arranging the first vibration system to surround the second vibration system diminishes the size of the coaxial speaker. In the magnet system, the first magnet, the second yoke, the second magnet and the third yoke are successively stacked, and the second yoke includes a protrusion towards the second diaphragm, a first magnetic gap is formed between the first magnet and the first yoke, a second magnetic gap is formed between the second magnet and the protrusion, the first coil and the second coil are separately inserted into the first magnetic gap and the second magnetic gap. In this manner, the two vibration systems share one magnet system, thus effectively achieving cost down. Besides, because of the protrusion, the magnet system forms a closed-loop magnetic field, thus achieving higher magnet utilization and improving the vibration performance of the coaxial speaker.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker comprising:

a frame;

a magnet system mounted on the frame, comprising a first yoke fixed to the frame, a first magnet received in the first yoke, a second yoke, a second magnet and a third yoke sequentially stacked on one side of the first magnet away from the first yoke;

a first vibration system, comprising:

a first diaphragm mounted on the frame; and a first coil configured to drive the first diaphragm;

a second vibration system surrounded by and coaxially arranged with the first vibration system, comprising:

a second diaphragm mounted on the third yoke; and a second coil configured to drive the second diaphragm; wherein the second yoke comprises a protrusion towards the second diaphragm; a first magnetic gap is formed between the first magnet and the first yoke; the second magnet surrounds the protrusion at interval forming a second magnetic gap; the first coil is inserted into the first magnetic gap; the second coil is inserted into the second magnetic gap; the first magnet and the second magnet has opposite magnetization directions parallel to a vibration direction.

2. The coaxial speaker as described in claim 1, wherein the first yoke comprises a bottom wall configured to support the first magnet, a side wall bent and extended from the bottom wall towards the first diaphragm, and a fixation wall bent and extended from the side wall away from the second yoke; the fixation wall is fixed to the frame; the second yoke is disposed opposite to the fixation wall along the vibration direction.

3. The coaxial speaker as described in claim 2, wherein the second yoke comprises a first magnetic portion sandwiched between the first magnet and the second magnet, a second magnetic portion bent from an edge of the first magnetic portion and extended to an inner side of the second magnet, and a third magnetic portion connected to the second magnetic portion; the protrusion is formed by the second magnetic portion and the third magnetic portion; the second magnet is spaced apart from the second magnetic portion to form the second magnetic gap; the third magnetic portion is disposed opposite to the third yoke along the vibration direction.

4. The coaxial speaker as described in claim 3, wherein the magnet system further comprises a vent hole penetrating the bottom wall and the first magnet along the vibration direction; the vent hole is disposed opposite to the third magnetic portion.

5. The coaxial speaker as described in claim 1, further comprising a holder fixed to the third yoke; the second diaphragm comprises a second dome in a central position and a second edge portion surrounding the second dome; an outer edge of the second edge portion is fixed to the holder; the second dome is arranged opposite to the protrusion along the vibration direction; the second dome protrudes along a direction away from the protrusion.

6. The coaxial speaker as described in claim 5, further comprising a mesh cover disposed above the second diaphragm at interval; a plurality of sound holes is provided on the mesh cover; an outer edge of the mesh cover is fixed to the holder.

7. The coaxial speaker as described in claim 6, wherein the first diaphragm comprises a first inner portion fixedly connected to the mesh cover, a first outer portion fixedly connected to the frame, and a first dome connecting the first inner portion and the first outer portion; along the vibration direction, the first inner portion is disposed on a side of the first outer portion closer to the magnet system.

8. The coaxial speaker as described in claim 7, wherein the mesh cover comprises a sound portion having the sound holes, a fixation portion surrounding the sound portion and fixed to the holder, and a support portion extended from the fixation portion towards the frame; an inner edge of the first inner portion is fixed to the support portion; an outer edge of the first inner portion is fixed to the first dome.

9. The coaxial speaker as described in claim 7, further comprising a supporter including one end fixed to the first dome and the other end fixed to the frame.

10. The coaxial speaker as described in claim 7, wherein the first vibration system further comprises a first skeleton fixedly connected to the first dome; the first coil is inserted into the first magnetic gap through the first skeleton; the second vibration system further comprises a second skeleton fixedly connected to the second dome; the second coil is inserted into the second magnetic gap through the second skeleton.

* * * * *